United States Patent

[11] 3,622,295

[72] Inventors David Gordon Loukes;
William Ramsey Maltman, both of Prescot,
England
[21] Appl. No. 839,248
[22] Filed July 7, 1969
[45] Patented Nov. 23, 1971
[73] Assignee Pilkington Brothers Limited
Liverpool, Lancashire, England
[32] Priority July 15, 1968
[33] Great Britain
[31] 33,676/68

[54] METHOD AND APPARATUS FOR PRODUCING COATED FLAT GLASS
13 Claims, 3 Drawing Figs.

[52] U.S. Cl. ................................................ 65/30,
65/99 A, 65/182 R, 117/124 C, 204/180 R, 204/300
[51] Int. Cl. ....................................................... C03c 17/00,
C03b 23/00

[50] Field of Search ........................................... 65/30, 60,
99 A, 182 R; 204/300, 180 R; 161/1; 117/124 C

[56] References Cited
UNITED STATES PATENTS
| | | | |
|---|---|---|---|
| 3,467,508 | 9/1969 | Loukes et al. ................ | 65/30 |
| 3,505,048 | 4/1970 | Plumat ......................... | 65/30 |
| 3,429,742 | 2/1969 | Grego et al. .................. | 117/12 A |
| 3,479,217 | 11/1969 | Spanoudis .................... | 117/124 X |

*Primary Examiner*—Reuben Friedman
*Assistant Examiner*—Robert L. Lindsay
*Attorney*—Morrison, Kennedy & Campbell ABSTRACT: A concentration of elemental metal is built up in a glass surface by subjecting the glass, at a suitable elevated temperature, to ion exchange and ion reduction treatments alternately. The ion exchange may be effected electrolytically or by vapor deposition, and the ion reduction may be effected by exposing the glass surface to a reducing atmosphere.

PATENTED NOV 23 1971

Inventors
DAVID GORDON LOUKES and
WILLIAM RAMSEY MALTMAN
By
Morrison, Kennedy & Campbell
Attorneys

METHOD AND APPARATUS FOR PRODUCING COATED FLAT GLASS

BACKGROUND OF THE INVENTION

This invention relates to the manufacture of glass, and specifically to the manufacture of glass with a desired concentration of elemental metal in its surface.

Metal can be introduced into glass by electrolytic processes, and by migration of metal ions into the glass at high temperature in a reducing atmosphere. Metal ions which have migrated into the glass are subsequently reduced to the metallic state.

It is sometimes desirable to achieve a very high concentration of elemental metal in the glass surface, for example when making a highly reflective layer. Hitherto the concentration of elemental metal which can be introduced into the glass surface has been determined by the ionic concentration of mobile cations in the original glass surface.

It is a main object of the present invention to provide a method and apparatus whereby the concentration of elemental metal introduced into the glass surface, is built up to several times the ionic concentration of the original mobile cations in the untreated glass.

SUMMARY

According to the present invention a method of manufacturing glass having a desired concentration of elemental metal in its surface, comprises subjecting the glass, at a temperature at which it is susceptible to surface modification, to surface treatment by causing metal ions to enter the glass surface followed immediately by reduction of the metal ions to the elemental metal, and repeating such surface treatment successively with the same or different metals to build up a desired concentration of elemental metal in the glass surface.

Each combination of ion exchange and reduction steps introduces a relatively small proportion of metal into the glass surface and reduction of the metal ions introduced at each step takes place while those ions are close to the glass surface.

According to one embodiment of the invention the metal ions are caused to enter the glass electrolytically from a molten metal body in contact with the glass surface by passing an electric current between the molten metal body and the glass surface, which molten metal body acts as an anode of the electrolytic circuit.

The molten metal body preferably clings to a metal-locating member to which the current is supplied. The molten metal body may cling to a metal bar which is soluble in the molten metal body.

In one embodiment of the invention the molten metal body is moved repetitively over each region of the surface of the glass to be treated, reduction of the metal ions in the glass surface being effected by exposing the said surface to a reducing atmosphere between successive passages of the anode over each respective surface region.

Alternatively, the glass may be moved past an anode structure comprising a plurality of molten metal bodies contacting the glass and constituting molten metal anodes spaced apart in the direction of glass movement, the spaces between adjacent anodes containing a reducing atmosphere.

This latter method is particularly applicable to the manufacture of flat glass in the form of a continuous ribbon, and the invention can also be applied to the manufacture of float glass in which a ribbon of glass is advanced along a bath of molten metal. From this aspect the invention provides a method of manufacturing float glass having a desired concentration of elemental metal in one face of the glass, comprising advancing float glass in ribbon form along a bath of molten metal, contacting the upper face of the glass with a plurality of molten metal bodies extending transversely of the ribbon of glass, which bodies are spaced apart in the direction of advance of the glass, and exposing the upper face of the glass to a reducing atmosphere in the spaces between the molten metal bodies.

The ions may alternatively be introduced into the glass by ion exchange from the vapor phase.

The invention further provides apparatus for use in the manufacture of glass by the above-defined method, said apparatus comprising means for supporting glass to be treated at a temperature at which the glass is susceptible to surface modification, an anode including a body of molten metal to be introduced into the glass, which body has a surface in electrical contact with a surface of the glass, an electrical current source connected to the anode and arranged to pass an electrolytic current into a surface of the glass from said molten metal body, means confining a reducing atmosphere over said surface of the glass, and means for effecting relative movement between the glass and the anode structure in such a way that each surface region of the glass is subjected to a succession of electrolytic surface treatments by said molten metal, alternating with ion reduction treatments by the reducing atmosphere.

In one embodiment of the invention for use in the manufacture of flat glass in ribbon form, the support means comprises means permitting advance of the glass in ribbon form at a controlled rate successively past a plurality of said anodes spaced apart in the direction of advance of the ribbon, the spaces between successive anodes being filled with a reducing atmosphere.

Further the invention provides apparatus for use in the manufacture of float glass which is advanced in ribbon form along a bath of molten metal, wherein the anodes are mounted above the bath surface so that the molten metal bodies contact the upper face of the glass, and the bath is connected to the electrical current source so as to act as the cathode for electrolytic treatment of the glass as it passes beneath the molten metal bodies.

For use in the surface treatment of a glass article, the apparatus may comprise a molten metal support for the article and means for moving the anode cyclically over a surface of the article so that each surface region is swept repetitively thereby.

The invention also comprehends glass having a concentration of elemental metal in its surface, produced by a method as defined above.

DESCRIPTION OF THE PREFERRED EMBODIMENTS

Figure 1:
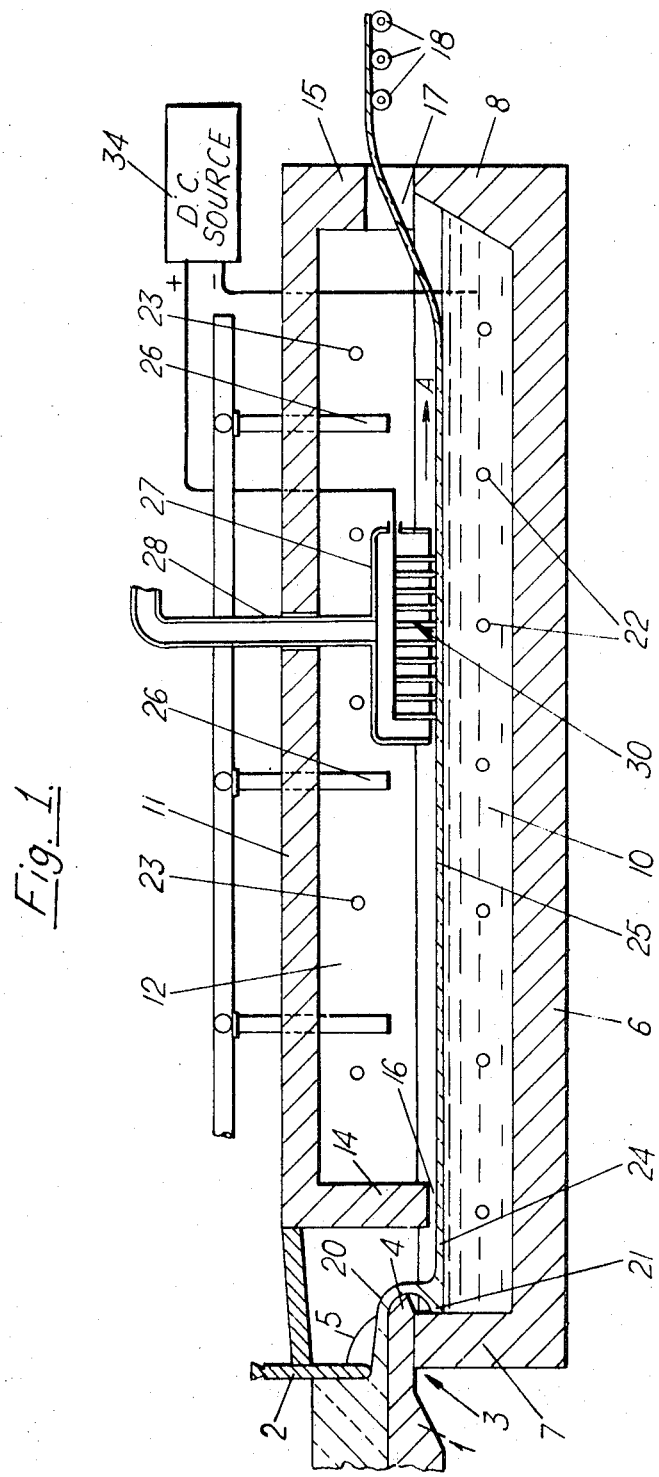
FIG. 1 is a diagrammatic longitudinal vertical section through an apparatus according to one embodiment of the invention.

Referring to FIG. 1, a forehearth of a continuous glass melting furnace is indicated at 1 and a regulating tweel at 2. The forehearth 1 ends in a spout 3 comprising a lip 4 and side jambs 5, one only of which is shown in FIG. 1.

The spout 3, which has a generally rectangular cross section, is disposed above the floor 6 of an elongated tank structure having integral end walls 7 and 8 at the inlet and outlet ends of the tank respectively. The tank structure holds a bath of molten metal 10 comprising, for example, molten tin or an alloy in which tin predominates, the bath having a specific gravity greater than that of glass.

A roof 11 having depending sidewalls 12 (one only of which is shown) and integral depending end walls 14, 15 at the inlet and outlet ends respectively of the bath is supported over the tank structure. The inlet and outlet end walls 14, 15 respectively define inlets and outlets 16, 17 for the glass, the outlet 17 being located above the surface of the bath. Driven rollers 18 are arranged externally of the outlet 17 to guide the ultimate ribbon of glass formed on the bath 10 through the outlet 17. The rollers convey the glass ribbon to an annealing lehr in a well-known manner, and also apply a tractive effect to the ribbon to draw it along the bath in the direction of the arrow A.

Molten soda/lime/silica glass 20 is poured over the spout 3 on to the molten metal bath 10, the rate of flow of the molten glass being regulated by the tweel 2. In falling from the spout 3 the molten glass has a free fall of a few inches, exaggerated in FIG. 1, on to the surface of the bath 10. This free fall is such as to ensure the formation of a heel 21 of molten glass behind the glass 20 pouring over the spout 3, which heel 21 extends up to the inlet end wall 7 of the tank structure.

The temperature of the molten glass is regulated by thermal regulators 22, 23 disposed in the molten metal bath 10 and in the headspace over the bath respectively so as to ensure that a layer of molten glass 24 is established in the surface of the bath 10. As this layer 24 advances from the inlet 16 in the direction of arrow A there is lateral flow of the glass under the influence of surface tension and gravity so that a buoyant ribbon 25 is developed as the limit of this free flow, the width of the tank structure being such as not to impede this lateral flow.

A protective gas, for example nitrogen or another inert gas, is supplied to the headspace over the bath 10 through ducts 26 which are provided at intervals in the roof 11. Thus a plenum of protective gas is maintained in this headspace, with a continuous outward flow of protective gas passing through the inlet 16 and outlet 17.

At a region of the bath 10 where the glass ribbon 25 is at a sufficiently high temperature to be susceptible to surface modification, a hood structure 27 is disposed in the bath headspace, the hood structure 27 leaving an open lower end which is disposed in close juxtaposition to the surface of the bath 10, so that the interior of the hood structure 27 is for practical purposes substantially isolated from the remainder of the bath headspace. A conduit 28 communicates with the interior of the hood structure 27 and extends outwardly of the roof 11 to a source (not shown) of a reducing gas, conveniently hydrogen. The reducing gas may be supplied to the interior of the hood structure 27 either alone or in admixture with an inert gas such as nitrogen. The hood structure 27 is elongated in the direction A of ribbon advance and extends transversely across the entire width of the glass ribbon 25.

An anode structure 30 is mounted within the hood structure 25 and comprises (FIG. 2) an array of elongated parallel metallic anode members 31 extending transversely across the ribbon 25 and parallel to the surface thereof. Each anode member 31 has a lower face 32 which is parallel to and closely spaced from the surface of the ribbon 25. To each lower face 32 clings a molten metal body 33 which constitutes a molten metal anode and which makes electrical contact with the upper face of the glass ribbon 25.

The anode members 31 are connected individually, or, as shown in FIG. 1, collectively, to the positive terminal of a direct current electrical source 34, the negative terminal of which is connected, as shown diagrammatically in FIG. 1, to the metal bath 10.

At the temperature of the surface treatment of the glass, which is typically of the order of 750° C., the glass is electrically conductive and constitutes in effect the electrolyte of an electrolytic circuit. Metallic ions enter the upper surface of the glass ribbon 25 from the molten metal bodies 33 to modify the glass characteristics. It is thought that the metal ions enter the glass as a result of ion exchange with sodium ions in the glass.

Each anode member 31 is very narrow, so that each molten body 33 clinging to its anode member 31 has a very small extent in the direction of glass ribbon advance, A. Typically, for a rate of ribbon advance of 150 inches per minute, each anode member 31 may extend ⅛ inch in the direction of ribbon advance, the anode members 31 being regularly spaced at intervals of 2 inches.

Because each of the anodes constituted by the molten metal bodies 33 introduce only a small fraction of the total quantity of the metal ions which enter the glass, the depth to which metal ions are driven into the glass surface, as it passes beneath any one of the anodes is very small. The reducing atmosphere which diffuses into the glass in each interanode space reduces to the metallic state substantially all of the metal ions introduced into the glass from the last molten anode 33, before ions can diffuse deeper into the glass. This results in a concentration of elemental metal in the surface of the glass, which concentration builds up as the glass passes beneath the successive molten anode bodies, because the elemental metal in the metal enriched surface cannot diffuse in the glass, and it therefore remains in or close to the surface of the glass ribbon as further migrations of metal ions are imposed into the metal enriched surface region of the glass and as each influx of ions is reduced. For example, where the molten metal bodies are copper/bismuth alloy, and the reducing atmosphere is hydrogen, copper ions enter the glass and the reduction process may be represented by:

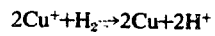

The resulting hydrogen ions in the glass undergo ion replacement by copper ions driven into the glass surface by electrolytic action from the next of the molten bodies 33. The hydrogen ions are driven more deeply into the body of the glass, and cations, e.g., sodium ions are driven out of the glass at the interface with the molten metal bath which acts as the cathode. Copper ions newly introduced into the glass surface are then reduced to the metallic state as soon as the glass surface passes from beneath the molten body 33. There is thus a release of elemental copper particles in the extreme surface layer of the glass and the concentration of copper metal in the glass surface as a result of the repetitive treatment is several times greater than the ionic concentration of the original mobile cations in the glass surface.

It will be appreciated that by using the anode structure 30 described above the advancing glass ribbon 25 is subjected to a succession of electrolytic ion-exchange steps (at each electrode member 31) alternating with ion-reduction steps (between adjacent pairs of electrode members 31). In effect, the buildup of ions in the glass surface takes place in a series of short steps or pulses, each followed by an ion-reduction step to give the elemental metal. Consequently, a layer of the elemental metal builds up in or close to the upper surface of the glass ribbon 25. The concentration of metal in this surface layer depends on the number of times the ion-exchange/ion reduction sequence of operations is repeated—that is, on the number of anode members 31 (and clinging molten metal bodies 33) in the anode structure 30.

Figure 2:
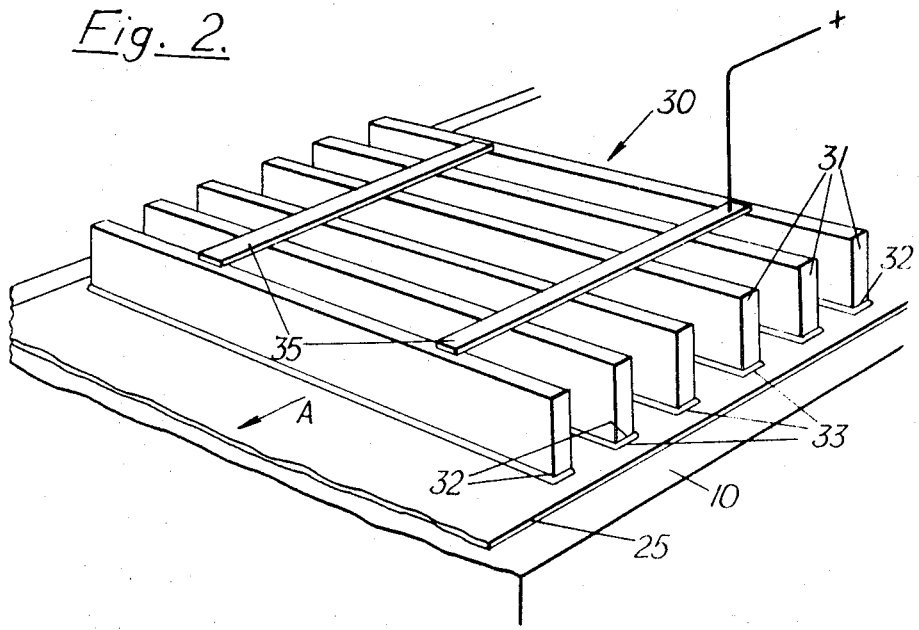
FIG. 2 is a diagrammatic perspective view on an enlarged scale of the anode structure employed in the apparatus of FIG. 1, with the hood structure removed.

The number of anode members 31 is exaggeratedly small in FIGS. 1 and 2 for ease of illustration. In practice the number of anode members 31 would typically be of the order of 50.

Two examples of electrolytic processes using the apparatus of FIGS. 1 and 2 are given below:

EXAMPLE I

An anode structure 30 comprising 50 anode members 31 is used, each anode member comprising a copper bar having a wetted surface 32 which is ⅛-inch long in the direction A of ribbon advance. The anode members 31 are regularly spaced apart at 2-inch intervals and the glass ribbon, which is 100 inches wide, is advanced at a speed of 150 inches per minute. The treatment is effected with the glass at a temperature of about 750° C. using a current of 50 amps (i.e., 1 amp per anode member 31) and a reducing atmosphere containing a high concentration of hydrogen. The resulting glass ribbon had a layer of metallic copper in its surface displaying a reflectivity of about 50 percent.

EXAMPLE II

An anode structure 30 comprising 30 anode members 31 is arranged in a region of the bath 10 where the glass temperature is about 700° C. Each anode member 31 comprises a copper bar 0.125-inch thick, with its thickness extending in the direction of ribbon advance A, the separation between adjacent anode members 31 being equal to the distance travelled by the ribbon 25 in 1 second—that is, 2 inches for a rate of ribbon advance of 120 inches per minute. Each anode member 31 is arranged to pass an electrolytic current of 50 milliamps per 1.5 inches of width in a direction transverse to the direction of ribbon advance (i.e., along the width of the ribbon). The reducing atmosphere comprises a mixture of 50 percent hydrogen and 50 percent nitrogen.

In both the examples described above, metallic copper is introduced into the glass surface. A similar technique can be used for introducing other reducible metallic ions into the glass.

The molten metal body 33 clinging to each anode member 31 may be an alloy consisting of an inert solvent metal e.g., bismuth, and a higher melting point metal e.g., copper or silver. The anode members 31 to which the molten bodies 33 cling are made of the pure high melting point metal e.g., copper or silver. With this arrangement the high melting point constituent of the alloy is continuously replenished by dissolution of the anode members at the same rate as the high melting point metal is being consumed from the molten bodies in treating the glass.

The metal dissolved by the bodies 33 enters the glass under the influence of the applied electric field, following ion exchange with sodium ions in the glass, as described previously. As anode metal is removed from the molten bodies 33 and enters the glass, more metal is dissolved by the bodies 33 from the anode members 31 to maintain an equilibrium concentration of the metal in the molten alloy bodies 33. Each molten body 33 therefore acts as an effective "buffer" between the respective anode member 31 and the glass ribbon 25.

To assist the wetting of a copper anode 31 by a molten body 33 of bismuth a small proportion of lead (about 2 percent) may be added to the body 33.

Since the amount of molten material in each body 33 is small, and this material clings to the respective anode member 31, the anode structure 30 can be disposed in regions where the glass temperature is as high as 950° C. without causing distortion of the glass surface.

When the molten anodes are constituted by a low melting point metal e.g., lead, the anode members may be made of, or faced with, an insoluble high melting point metal such as ruthenium. Lead is added to the molten bodies 33 to compensate for the metal consumed in treating the glass.

A molten salt can be used as a vehicle for metallic ions. For example the molten bodies 33 may be of molten cuprous chloride clinging to copper anode members 31. Cuprous ions enter the glass and the cuprous chloride is continuously replenished by reaction of chlorine released at the anode members 31 with the copper of those members.

The anode structure 30 is suitably foraminous to enable the reducing atmosphere to permeate between adjacent anode members 31. For example, the anode members 31 may be supported from an openwork frame, as indicated diagrammatically at 35 in FIG. 2.

In a modified arrangement the anode members 31 may be individually connected to separate current supply sources which supply current at different voltages. For example the voltage of the supply to the first anode member may be 1 volt with a progressive increase of 1 volt from anode to anode. In some circumstances this ensures that the same current flows from each of the molten bodies 33 into the glass surface.

Each of the anode members may be connected to its own transformer and rectifier circuit. Alternatively a single high current DC source is used and a plurality of tappings on a potentiometer connected across the source output provide the individually regulatable voltages for the anodes.

Alternative arrangements may be employed in order to apply successive electrolytic treatments to the glass, each electrolytic treatment being followed by an ion-reduction step. For example, instead of advancing the glass ribbon 25 continuously past the electrode structure 30, the glass, in sheet form or in the form of an article, may be held in a fixed position and an electrode structure, reciprocated back and forth over the surface of the glass to be treated, said surface being exposed to a reducing atmosphere.

Figure 3:
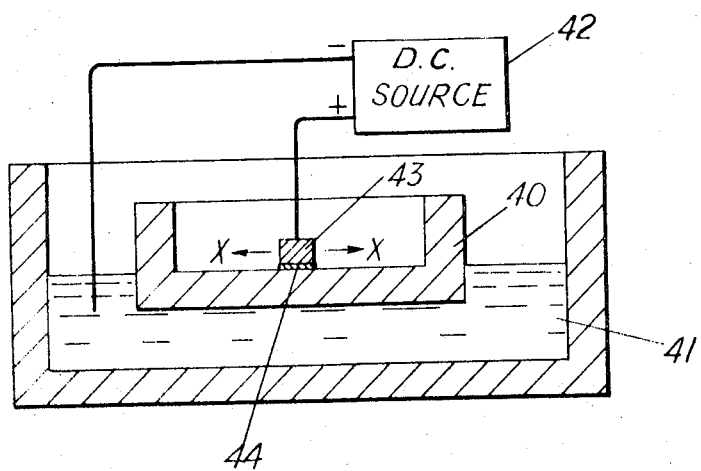
FIG. 3 is a diagrammatic cross-sectional view of an apparatus for treating glass articles in accordance with another embodiment of the invention.

FIG. 3 illustrates such a process as applied to the treatment of a hollow glass half block 40. The block is supported on a molten metal bath 41, for example of bismuth, which is connected to the negative terminal of a direct current source 42. The upper surface of the half block, when floating on the bath 41, is to be treated by the method of this invention.

For this purpose an anode member 43 is disposed adjacent said upper surface and is in electrical contact with said surface by way of a molten anode body 44 which clings to the member 43. The member 43 is connected to the positive terminal of the direct current source 42 and is mounted on a suitable carriage (not shown in the interests of clarity) for reciprocating movement parallel to the upper surface of the article 40, in the direction indicated by arrows X. A reducing atmosphere, for example a hydrogen/nitrogen mixture, is maintained over the upper surface of the article 40 by means of a suitable hood structure (not shown) similar to the hood structure 27 of FIG. 1.

In the illustrated example the anode member 43 comprises copper and the molten body 44 comprises bismuth. It will be apparent that as the member 43 is reciprocated across the upper surface of the article 40, each zone of this upper surface is subjected to a brief electrolytic action each time the molten body 44 passes across it followed immediately by an ion-reducing action due to the reducing atmosphere.

To achieve treatment of article 40 by the arrangement of FIG. 3 approximately the same as the glass ribbon treatment described in example II above, a copper anode 43 having a thickness of 0.125 inch in the direction X of its reciprocating movement is reciprocated at an average speed of about 2 inches per second while a current of 50 milliamps was passed through the anode 43 for a period of 30 seconds. The anode 43 has an effective width in a direction transverse to the direction of reciprocation X of 1.5 inches and the total amplitude of the reciprocating movement is in this example 2 inches, so that an area of 1.5×2 square inches of the upper surface of the article 40 is treated.

As an alternative to reciprocation of the member 43 the article 40 and the member 43 with its clinging body 44 could be rotated relatively to each other about an axis perpendicular to the upper surface of the article 40, the anode member 43 extending in a radial direction with respect to the axis of rotation. The anode member may be shaped as a segment having an angle of 1 radian thereby producing uniform treatment of the article surface.

The bottom surface of a glass article can be treated by reversing the polarity of the supply so that the molten metal bath 41 is electrically positive. For example, the bath 41 may be of molten copper/bismuth alloy and, the article 40 reciprocated vertically or, where the article 40 is held at a fixed position in the bath 41, the bath metal may be pumped so that its level rises and falls cyclically. This results in the electrical contact with the bottom surface of the article being interrupted cyclically and contact of the bottom surface of the article by reducing gas being established cyclically, so that the bottom surface acquires a highly concentrated surface layer of metallic copper.

As an alternative to the electrolytic treatments described above, the process according to the invention may be put into effect using ion-exchange from the vapor phase to introduce ions into a glass surface and then exposing the surface to a reducing atmosphere to reduce the ions to the elemental metal. For example, exposure of the glass surface to silver bromide vapor would cause silver ions to be introduced into the glass surface in exchange for sodium ions. By repeating the ion-exchange and ion-reduction steps successively a large number of times a desired concentration of elemental metal can be built up in the glass surface.

It will be appreciated that since metal is deposited in, rather, than on, the glass surface by the method of the present invention the resulting metal layers or films are more durable than chemically deposited or vacuum-evaporated films on glass surfaces, and no special protection for the glass surface is necessary.

The present invention may be used to form fully or partially reflecting metallic layers in glass surfaces. Where the metal deposited is such that it reflects infrared radiation preferentially, such as copper, glass results which is capable of preferentially rejecting infrared solar energy.

Special effects can be obtained by subjecting the glass to treatment with more than one metal. A mixture of two different metals may be deposited, for example by making alternate anode members 31 in FIG. 1 of different metals, or alternate layers of different metals may be formed by carrying out successive treatments in accordance with the invention using anodes of different metals.

We claim:

1. Method of manufacturing glass having a desired concentration of elemental metal in its surface, comprising thermally conditioning the glass of a temperature at which it is susceptible to surface modification, imposing migration of metal ions into a region of the glass surface, immediately thereafter exposing that region to a reducing agent to reduce to elemental metal the metal ions which have migrated into the glass surface, then imposing further migration of metal ions into that metal enriched surface region of the glass, again exposing that region to a reducing agent to reduce to elemental metal the latest influx of metal ions into the glass surface, said migration and reduction steps being repeated successively to build up a desired concentration of elemental metal in the glass surface.

2. A method according to claim 1, comprising contacting the glass surface with a molten metal body, and connecting said body as an anode to pass electric current between the body and the glass surface to cause said ionic migration into the glass.

3. Method according to claim 2, comprising causing the molten metal body to cling to a metal locating member arranged adjacent the glass surface, and supplying the current to said member.

4. Method of manufacturing float glass having a desired concentration of elemental metal in one face of the glass, comprising advancing float glass in ribbon form along a bath of molten metal, contacting the upper surface of the ribbon of glass with a plurality of molten metal bodies extending transversely of the ribbon of glass, which bodies are spaced apart in the direction of advance of the glass, connecting each body as an anode to pass electric current between the bodies and the glass thereby enforcing ionic migration from each body into the upper surface of the ribbon and exposing the upper surface of the ribbon to a reducing atmosphere in the spaces between the molten metal bodies to reduce metal ions in the glass surface to elemental metal which progressively accumulates to the desired concentration as the glass advances beneath the molten bodies.

5. Apparatus for the manufacture of glass having a desired concentration of elemental metal in its surface, said apparatus comprising: means supporting glass to be treated at a temperature at which the glass is susceptible to surface modification; an anode including a body of molten metal to be introduced into the glass; which body has a surface in electrical contact with a surface of the glass; an electrical current source connected to the anode and arranged to pass an electrolytic current into a surface of the glass from said molten metal body; means confining a reducing atmosphere over said surface of the glass; and means effecting relative movement between the glass and the anode to subject each surface region of the glass to a succession of electrolytic surface treatments by said molten metal, alternating with ion reduction treatments by the reducing atmosphere 6. Method according to claim 2, comprising moving repetitively over each region of the surface of the glass to be treated, and reducing the metal ions in the glass surface by exposing the said surface to a reducing atmosphere between successive passages of the molten metal body over each respective surface region.

7. Method according to claim 2, comprising moving the glass past a plurality of molten metal bodies contacting the glass and constituting molten metal anodes which are spaced apart in the direction of glass movement, and supplying a reducing atmosphere into the spaces between adjacent anodes.

8. Apparatus according to claim 5, for the manufacture of flat glass ribbon form, including a plurality of said anodes spaced apart in the direction of ribbon advance, and wherein said support means comprises means permitting advance of the glass in ribbon form at a controlled rate past said anodes in succession, the spaces between successive anodes being filled with the reducing atmosphere.

9. Apparatus according to claim 8, for the manufacture of float glass, wherein the glass support means comprise a bath of molten metal, and wherein the anodes are mounted above the surface of said bath, the molten metal bodies contacting the upper face of the glass, and including means connecting the bath to the electrical current source to complete an electrolytic circuit for the treatment of the glass as it passes beneath the anodes.

10. Glass having a concentration of elemental metal in its surface, produced by the method according to claim 1.

11. Apparatus according to claim 8, for the manufacture of float glass including a tank structure containing a headspace and a bath of molten metal comprising said glass support means, and wherein said means confining a reducing atmosphere over said surface of the glass comprises a hood structure in said headspace and surrounding said spaced apart anodes to substantially isolate the surrounded anodes from the remainder of said headspace.

12. Method according to claim 1 in which successive treatments are carried out using different metals to build up a concentration of at least two metals in the glass surface.

13. Method according to claim 2, in which the locating member is a metal bar which is soluble in the molten metal body.

* * * * *

UNITED STATES PATENT OFFICE
CERTIFICATE OF CORRECTION

Patent No. 3,622,295　　　　　　　　Dated　November 23, 1971

Inventor(s)　D. G. Loukes et al

It is certified that error appears in the above-identified patent and that said Letters Patent are hereby corrected as shown below:

Change the title of the invention to read as follows:

--METHOD AND APPARATUS FOR PRODUCING SURFACE MODIFIED FLAT GLASS--.

Signed and sealed this 1st day of August 1972.

(SEAL)
Attest:

EDWARD M. FLETCHER, JR.　　　ROBERT GOTTSCHALK
Attesting Officer　　　　　　　Commissioner of Patents

UNITED STATES PATENT OFFICE
CERTIFICATE OF CORRECTION

Patent No. 3,622,295          Dated     August 29, 1972

Inventor(s)  D.G. Loukes et al

It is certified that error appears in the above-identified patent and that said Letters Patent are hereby corrected as shown below:

IN THE CLAIMS

Column 7, line 28 delete "of" insert --to--

Column 8, line 18 after "moving" insert --the molten metal body--.

Signed and sealed this 2nd day of January 1973.

(SEAL)
Attest:

EDWARD M. FLETCHER, JR.                ROBERT GOTTSCHALK
Attesting Officer                      Commissioner of Patents